United States Patent [19]

Stanley

[11] 4,330,809
[45] May 18, 1982

[54] THERMAL PROTECTION CIRCUIT FOR THE DIE OF A TRANSISTOR

[75] Inventor: Gerald R. Stanley, Mishawaka, Ind.

[73] Assignee: Crown International, Inc., Elkhart, Ind.

[21] Appl. No.: 108,585

[22] Filed: Dec. 31, 1979

[51] Int. Cl.³ .............................................. H02H 5/04
[52] U.S. Cl. ..................................... 361/103; 361/79; 374/134
[58] Field of Search ...................... 361/103, 93, 94, 96, 361/161, 79, 78, 106; 328/143, 144; 73/342, 362 SC; 307/252 R, 252 B, 310; 323/68, 69

[56] References Cited

U.S. PATENT DOCUMENTS

| | | | |
|---|---|---|---|
| 3,622,849 | 11/1971 | Kelley, Jr. et al. | 361/103 X |
| 3,634,871 | 1/1972 | Siedband et al. | 361/103 |
| 3,916,180 | 10/1975 | Turtle | 328/144 X |
| 4,001,649 | 1/1977 | Young | 361/103 X |
| 4,052,744 | 10/1977 | Boothman et al. | 361/103 |

Primary Examiner—Patrick R. Salce
Attorney, Agent, or Firm—Oltsch, Knoblock & Hall

[57] ABSTRACT

A thermal protection circuit for the die of a transistor having a heat sink in which a signal proportional to the dissipative input current and a signal proportional to the dissipative applied voltage of the transistor are multiplied to produce a signal representative of the applied power to the transistor. This representative applied power signal is transformed into a simulated differential in temperature between the die of the transistor and its heat sink. Simultaneously, the temperature of the heat sink is determined and this temperature is added to the simulated differential in temperature between the die of the transistor and the heat sink to determine a sensed die temperature. A control responsive to this sensed die temperature reduces the applied power to the transistor.

7 Claims, 3 Drawing Figures

THERMAL PROTECTION CIRCUIT FOR THE DIE OF A TRANSISTOR

SUMMARY OF THE INVENTION

This invention relates to a thermal protection circuit for the die of a transistor and will have among other uses application to the protection of the power-handling output semi-conductors of solid-state amplifiers.

Various circuit designs have been utilized in an attempt to solve the problem of excessive localized heat production in transistors. Such heat production if not neutralized will lead to breakdown and destruction of the transistors. One popular circuit design is the V-I limiter. The V-I limiter suffers from a severe deficiency in that it sacrifices output in order to accommodate a maximum operating temperature which does not occur that often during normal operation of the device.

In this invention the instantaneous applied power to the transistor is determined and is converted into a simulated differential in temperature between the die of the transistor and its heat sink. To this differential in temperature is added the simultaneously determined heat sink temperature, resulting in a sensed die temperature. A control monitors the sensed die temperature during transistor operation and when a predetermined maximum is reached, the applied power to the transistor is reduced. In this manner the output of the transistor is automatically derated only at the obtainment of a prescribed maximum die temperature with the protection circuit normally allowing an unlimited output when the die temperature is below such maximum die temperature.

Accordingly, it is an object of this invention to provide a thermal protection circuit and method thereof which is for a transistor die and which has a reliable performance rating.

Another object of this invention is to provide a thermal protection circuit for the die of a transistor in which the circuit in sensing the die temperature is of highly acceptable accuracy.

Still another object of this invention is to provide a thermal protection circuit for the die of a transistor in which the output of the transistor is unlimited except at a specified maximum operating temperature of the die in which case the output of the transistor is automatically derated.

Still another object of this invention is to provide a thermal protection circuit which is for the die of a transistor and which is of economical construction.

Other objects of this invention will become apparent upon a reading of the following description.

BRIEF DESCRIPTION OF THE DRAWINGS

FIG. 3 is a basic circuit diagram of another embodiment of this invention.

DESCRIPTION OF THE PREFERRED EMBODIMENTS

The embodiments illustrated are not intended to be exhaustive or to limit the invention to the precise forms disclosed. They are chosen and described in order to best explain the basic principles of the invention and its application and practical use to enable others skilled in the art to utilize the invention.

Figure 1:
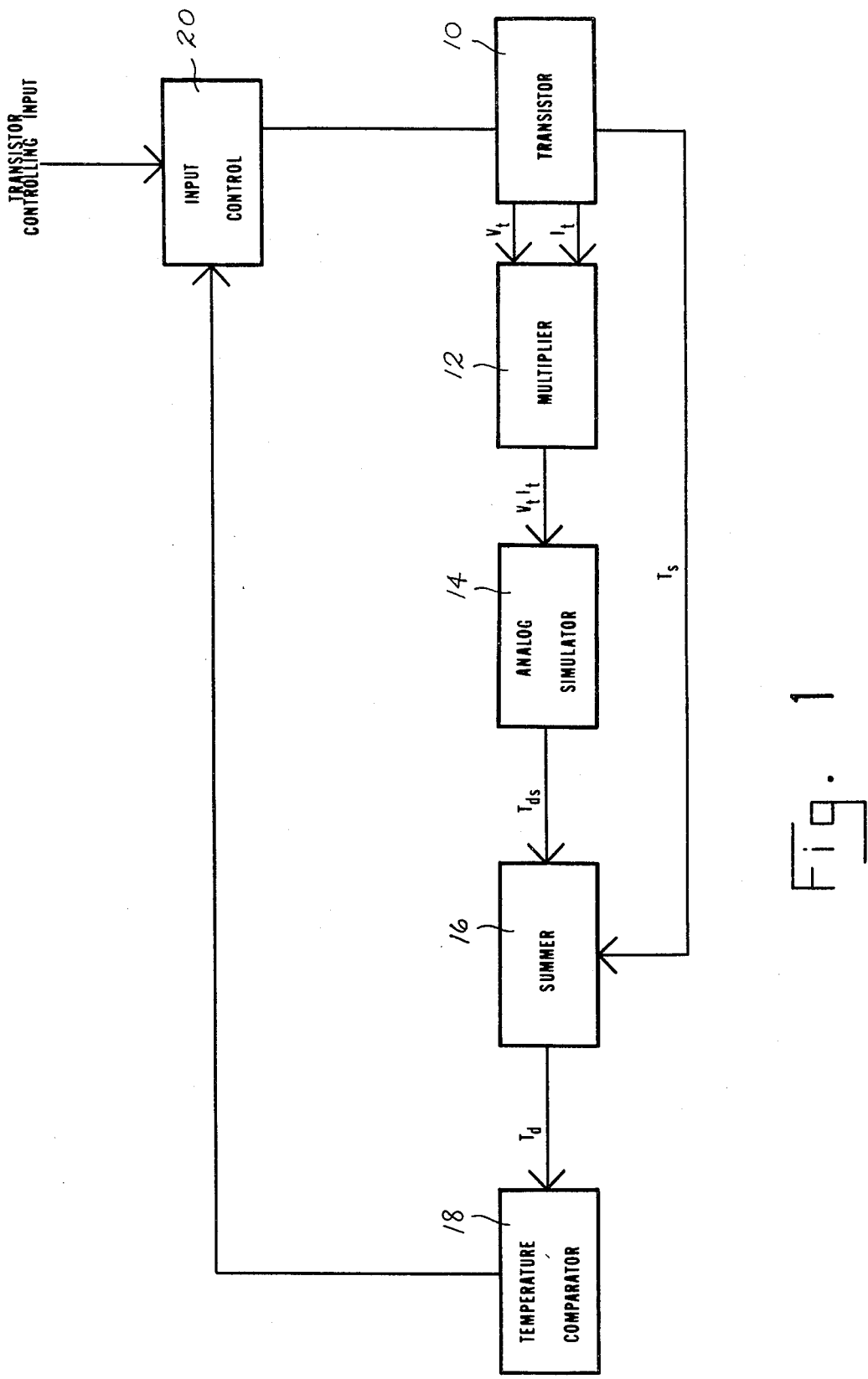
FIG. 1 is a block diagram of the method of this invention.

Referring first to FIG. 1, a signal $V_t$ which is representative and proportional to the dissipative applied voltage to a monitored transistor 10 and a signal $I_t$ which is representative and proportional to the dissipative input current to the transistor are inputs into a multiplier 12. $V_t$ for a bipolar type transistor would be representative of $V_{CE}$ and for a field effect type transistor would be representative of $V_{DS}$. $I_t$ would be representative of $I_C$ for a bipolar transistor and $I_D$ for a field effect transistor. Multiplier 12 multiplies $V_t$ and $I_t$ to provide a signal proportional to the dissipative applied voltage to transistor 10, illustrated as $V_t I_t$. This dissipative applied voltage is received by an analog simulator 14 which through its internal circuitry produces an output $T_{ds}$ which is representative of the simulated difference in temperature between the die of transistor 10 and the heat sink associated with the transistor. A summer 16 sums a signal $T_s$ which is proportional to the temperature of the heat sink associated with transistor 10 and the signal $T_{ds}$ which is representative of the temperature differential between the transistor die and its heat sink to provide a signal $T_d$ proportional to a sensed die temperature. This continuously determined but instantaneous sensed die temperature in the form of signal $T_d$ is fed to a temperature comparator 18 which is programmed to react at a selected maximum die temperature and produce a responsive signal which when received by input control 20 for transistor 10 causes the controlling input to the transistor to be reduced, thereby inturn reducing the heat generated within the transistor die.

Figure 2:
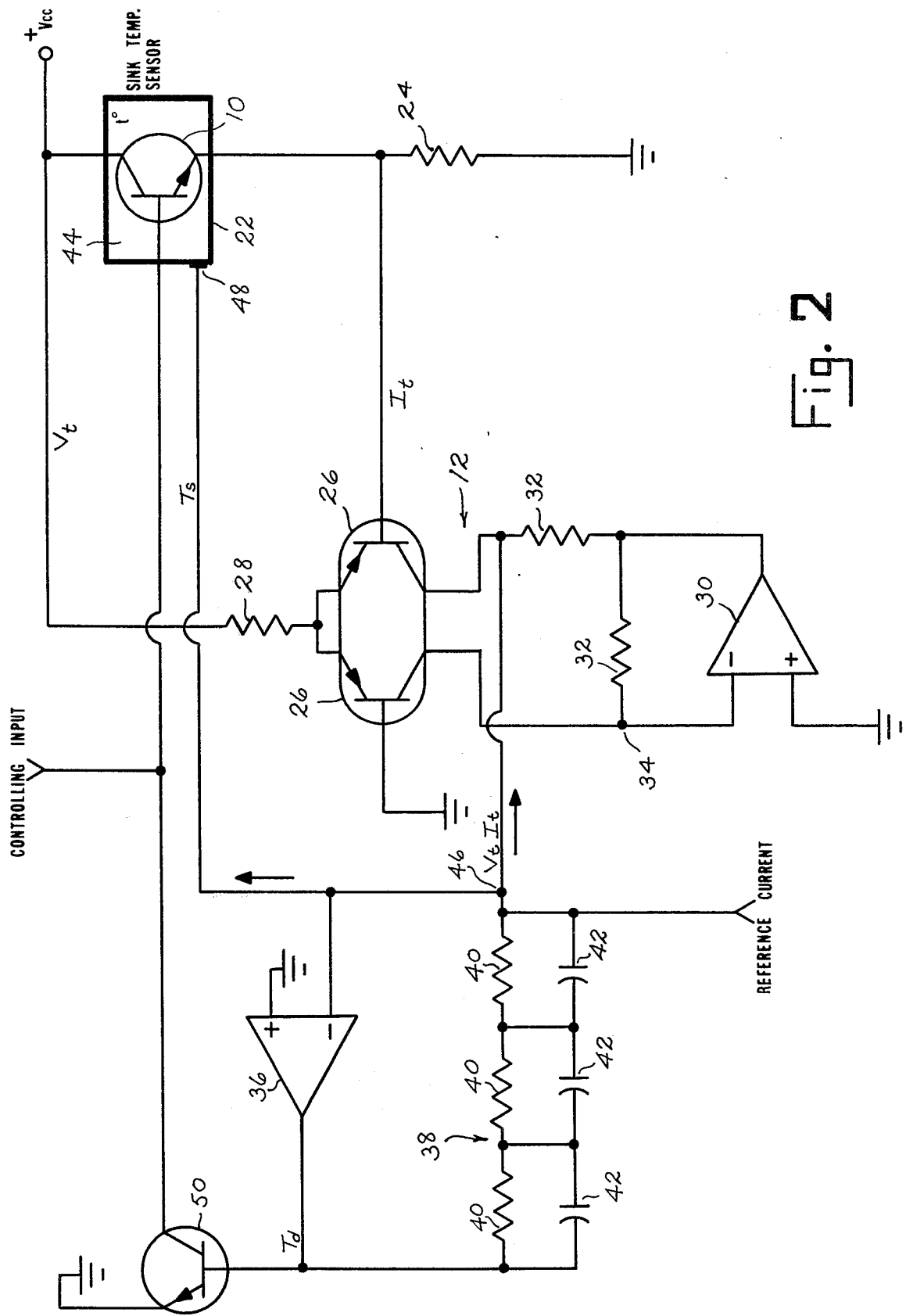
FIG. 2 is a basic circuit diagram of one embodiment of this invention.
Figure 7:
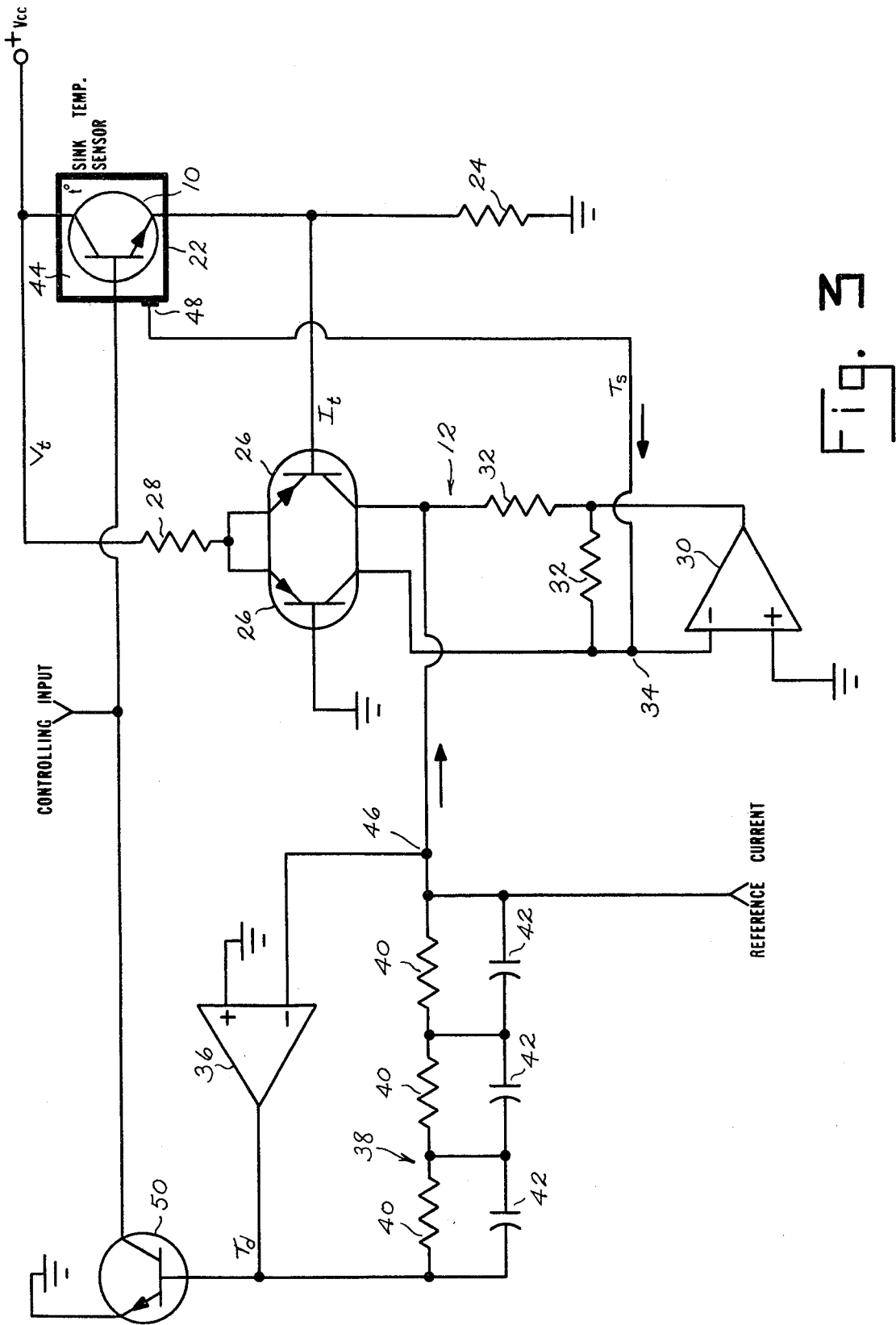

In FIG. 2 a basic thermal protection circuit is shown. Transistor 10 is illustrated as a bipolar transistor having a heat sink 22 in association with it. Heat sink 22 may be any of a variety of forms, such as the chassis upon which the transistor is mounted or an integral part of the transistor itself. Multiplier 12 is of the two-quadrant transconductance type which includes a differential pair of bipolar transistors 26. Resistor 28 connected between the collector of transistor 10 and the common connected emitters of multiplier transistors 26 creates a current proportional to the voltage across the collector-emitter junctions of transistor 10 which powers transistors 26. Resistor 24 connected to the emitter of transistor 10 is current sensing to provide a voltage differential at the bases of transistors 26.

A current representative of signal $V_t$ is received at the emitters of multiplier transistors 26 and a voltage representative of $I_t$ is received at the base of one transistor 26. The output signals from multiplier 12 are converted into a single-ended output current, a signal representative of the product of $V_t I_t$, by an operational amplifier 30 utilized as a current mirror in association with resistors 32 which are of a equal resistance value. Junction 34 within the mirror circuit is preferably at virtual ground.

The single-ended output current from multiplier 12 which is a signal proportional to the dissipated applied voltage of transistor 10 is fed into a high gain inverting operational amplifier 36 having a feedback network 38. Operational amplifier 36 serves the function of summer 16 in FIG. 1 and feedback network 38 serves the function of the analog simulator 14 also in FIG. 1. Feedback network 38 is a series of resistors 40 each connected in parallel with a capacitor 42. This combination of resistors 40 and parallel connected capacitors 42 is a thermal equivalent circuit for simulating the temperature of die 44 of transistor 10. The number of resistors 40 and parallel capacitors 42 can vary. Such an electrical analog which determines the thermal impedance of die 44 may be of the type shown or of other equivalent types known in the art. Junction 46 is preferably at virtual ground. A reference current, as noted, is used to bias the output voltage of amplifier 36.

Signal $T_{ds}$ is a voltage representative of the simulated temperature differential between transistor die 44 and heat sink 22. Feedback network 38 in conjunction with amplifier 36 takes signal $V_t I_t$ from the output of multiplier 12 and converts it into a voltage representative of signal $T_{ds}$.

A temperature sensitive integrated circuit 48 senses the temperature of heat sink 22 and has a current output or signal $T_s$ which is proportional to such temperature. Signal $T_s$ is combined with signal $T_{ds}$ at amplifier 36 to produce a voltage or the signal $T_d$. The signal output $T_d$ of amplifier 36 is received by a limiting transistor 50 serving the functional purpose of the temperature comparator 18 shown in FIG. 1. When the base-emitter forward bias of transistor 50 is reached upon receipt of signal $T_d$ from summing amplifier 36, the transistor is turned on causing the controlling input to transistor 10 to be shunted with such resulting input to the transistor being reduced. As the signal $T_d$ from amplifier 36 is reduced, representing a reduction in operating temperature of die 44 of transistor 10, such a voltage input recedes below the forward bias of transistor 50, turning off the transistor and permitting the controlling input to transistor 10 to resume at normal operating levels.

In an actual embodiment of the subject invention, transistor 50 is designed so as to turn on to produce its shunting function when the signal from summing amplifier 36 is representative of a 200° C. die temperature. The maximum or upper limiting temperature for the die of a sensed transistor monitored by the thermal protection circuit of this invention can vary depending upon the type and operating characteristics of the die and transistor. Also in an actual embodiment of the thermal protection circuit of this invention, the summing amplifier 36 was biased so as to saturate at a low junction temperature of 25° C. thereby making the protector circuit operable within the temperature range of 25° C. to 200° C.

The basic thermal protection circuit shown in FIG. 3 is similar to that shown in FIG. 2 with the exception that the signal $T_s$ from integrated circuit 48, which is a current representative of the temperature of heat sink 22 of transistor 10, is received by the input of operational amplifier 30 of the mirror circuit for multiplier 12 instead of being received by the input of summing amplifier 36. This modification will be utilized if the output signal from integrated circuit 48 is oppositely poled. In all other respects the components and their functions above described with respect to FIG. 2 apply equally to the circuit of FIG. 3.

Where a series of transistors are desired to be monitored by the thermal protection circuit of this invention and such transistors do not share the same heat sink or have the same power applied to all, it may be preferable to simply monitor the hottest of the group of transistors instead of utilizing an individual thermal protection circuit for each of the transistors. In the protection circuit of this invention, the use of virtual grounds within the circuit makes the circuit easier to service and to check for maintenance. Additionally, the control components which receive and monitor the sensed die temperature derived by the circuit can vary. When the thermal protection circuit of this invention is utilized in an amplifier, the output stages may be of a variety of types.

It is to be understood that the invention is not to be limited to the details above given but may be modified within the scope of the appended claims.

What I claim is:

1. A thermal protection circuit for a die of a transistor having a heat sink, said circuit comprising means for multiplying a signal proportional to the dissipative input current to said transistor by a signal proportional to the dissipative applied voltage of the transistor to produce a signal representative of the applied power to the transistor, means responsive to said representative applied power signal for simulating the differential in temperature between said die and heat sink, means for substantially simultaneously determining the temperature of said heat sink, means for summing said heat sink temperature and said differential in temperature between said die and heat sink to determine a sensed die temperature, and means for reducing said applied power to the transistor in response to said sensed die temperature, said multiplying means including a differential pair of transistors having common emitter junctions, resistance means for applying an input current to said common emitter junctions proportional to said dissipative applied voltage of the transistor.

2. The protection circuit of claim 1 and a current sensing means responsive to said dissipated input current to the transistor for producing a base input voltage to said differential pair of transistors.

3. The protection circuit of claim 1 and current mirror means for converting the output of said differential pair of transistors into a single-ended output constituting said applied power to the transistor.

4. The protection circuit of claim 3 wherein said means for determining said sink temperature produces a representative signal received by said current mirror means.

5. A thermal protection circuit for a die of a means for multiplying a signal proportional to the dissipative input current to said transistor by a signal proportional to the dissipative applied voltage of the transistor to produce a signal representative of the applied power to the transistor, means responsive to said representative applied power signal for simulating the differential in temperature between said die and heat sink, means for substantially simultaneously determining the temperature of said heat sink, means for summing said heat sink temperature and said differential in temperature between said die and heat sink to determine a sensed die temperature, and means for reducing said applied power to the transistor in response to said sensed die temperature, said temperature differential simulating means being an electrical analog means for determining the thermal impedance of said die, said summing means being an inverting operational amplifier having a feedback network, said feedback network constituting said electrical analog means, said analog means including a series connected network of resistors and capacitors with each resistor being connected in parallel with a capacitor, said signal of the multiplying means being received by said inverting operational amplifier.

6. The protection circuit of claim 5 wherein said means for determining said sink temperature produces a representative signal received by said inverting operational amplifier.

7. A thermal protection circuit for a die of a transistor having a heat sink, said circuit comprising means for multiplying a signal proportional to the dissipative input current to said transistor by a signal proportional to the dissipative applied voltage of the transistor to produce a signal representative of the applied power to the transistor, means responsive to said representative applied power signal for simulating the differential in temperature between said die and heat sink, means for substantially simultaneously determining the temperature of said heat sink, means for summing said heat sink temperature and said differential in temperature between said die and heat sink to determine a sensed die temperature, and means for reducing said applied power to the transistor in response to said sensed die temperature, said temperature differential simulating means being an electrical analog means for determining the thermal impedance of said die, said summing means being an inverting operational amplifier having a feedback network, said feedback network constituting said electrical analog means, said inverting operational amplifier being biased to saturate at an actual die temperature below which no monitoring of the die is required.

* * * * *